US009223914B2

(12) United States Patent
Fertig et al.

(10) Patent No.: US 9,223,914 B2
(45) Date of Patent: *Dec. 29, 2015

(54) AUTOMATED METHOD TO DETERMINE COMPOSITE MATERIAL CONSTITUENT PROPERTIES

(71) Applicant: Autodesk, Inc., San Rafael, CA (US)

(72) Inventors: Ray Fertig, Cheyenne, WY (US); Emmett Nelson, Laramie, WY (US); Don Robbins, Laramie, WY (US)

(73) Assignee: Autodesk, Inc., San Rafael, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,321

(22) Filed: Sep. 17, 2014

(65) Prior Publication Data

US 2015/0006134 A1     Jan. 1, 2015

Related U.S. Application Data

(63) Continuation of application No. 13/846,061, filed on Mar. 18, 2013, now Pat. No. 8,868,385, which is a continuation of application No. 13/011,076, filed on Jan. 21, 2011, now Pat. No. 8,401,829.

(60) Provisional application No. 61/297,037, filed on Jan. 21, 2010.

(51) Int. Cl.
*G06F 7/60*     (2006.01)
*G06F 17/10*     (2006.01)
*G06F 17/50*     (2006.01)

(52) U.S. Cl.
CPC ........ *G06F 17/5018* (2013.01); *G06F 2217/42* (2013.01); *G06F 2217/44* (2013.01)

(58) Field of Classification Search
USPC ............................................................ 703/2
See application file for complete search history.

(56) References Cited

U.S. PATENT DOCUMENTS

| 5,136,497 | A | 8/1992 | Coe et al. |
| 5,202,837 | A | 4/1993 | Coe et al. |
| 5,814,403 | A | 9/1998 | Anderson et al. |
| 6,411,945 | B1 | 6/2002 | Nakajima |
| 7,373,284 | B2 | 5/2008 | Stabelfeldt et al. |

(Continued)

FOREIGN PATENT DOCUMENTS

| WO | 2011091229 A2 | 7/2011 |
| WO | 2011091229 A3 | 7/2011 |

OTHER PUBLICATIONS

U.S. Appl. No. 13/011,076, Notice of Allowance mailed Nov. 13, 2012, 13 pages.

(Continued)

*Primary Examiner* — Saif Alhija
(74) *Attorney, Agent, or Firm* — Fish & Richardson P.C.

(57) ABSTRACT

According to an aspect, a method includes: receiving, at a machine comprising a processor and a memory, composite material properties for a composite material to be simulated; receiving, at the machine, a composite microstructure for the composite material to be simulated; and obtaining, using the processor and the memory, a set of adjusted material properties for one or more constituents of the composite material, for use in simulating the composite material, by processing the composite material properties and the composite microstructure using fixed constituent property constraints.

18 Claims, 3 Drawing Sheets

(56) References Cited

U.S. PATENT DOCUMENTS

| | | | |
|---|---|---|---|
| 7,561,995 B2 * | 7/2009 | Willis et al. ................ 703/6 |
| 8,027,820 B2 | 9/2011 | Tryon, III |
| 8,401,829 B2 | 3/2013 | Fertig et al. |
| 2003/0236588 A1 | 12/2003 | Jang et al. |
| 2005/0060130 A1 | 3/2005 | Shapiro et al. |
| 2006/0029807 A1 | 2/2006 | Peck |
| 2007/0075450 A1 | 4/2007 | Belegundu et al. |
| 2007/0106418 A1 | 5/2007 | Hagen et al. |
| 2008/0208540 A1 | 8/2008 | Burgos et al. |
| 2009/0326883 A1 | 12/2009 | Mizutani et al. |
| 2010/0299112 A1 | 11/2010 | Goldberg et al. |
| 2011/0178786 A1 | 7/2011 | Fertig et al. |
| 2012/0053907 A1 | 3/2012 | Hallquist |
| 2013/0218540 A1 | 8/2013 | Fertig et al. |

OTHER PUBLICATIONS

U.S. Appl. No. 13/011,076, Preliminary Amendment Filed Nov. 21, 2011, 7 pages.

International Application Serial No. PCT/US2011/022011, International Preliminary Report on Patentability mailed Aug. 2, 2012, 5 pages.

International Application Serial No. PCT/US2011/022011, International Search Report mailed Sep. 1, 2011, 3 pages.

International Application Serial No. PCT/US2011/022011, Written Opinion mailed Sep. 1, 2011, 3 pages.

Chawla, N, et al., "Microstructure-Based Simulation of Thermomechanical Behavior of Composite Material by Object-Oriented Finite Element Analysis", Materials Characterization 49, (2003), 395-407.

Fujii, D, et al., "Composite Material Design of Two-Dimensional Structures Using the Homogenization Design Method", Int. J. Numer. Meth. Enging 2001; 50, (2001), 2031-2051.

Huang, Zheng-Ming, "Simulation of the Mechanical Properties of Fibrous Composites by the Bridging Micromechanics Model", Composites: Part A 32, (2001), 143-172.

Hyun, et al., "Designing Composite Microstructures with Targeted Properties", J. Mater. Res., vol. 16, No. 1, (Jan. 2001), 6 pages.

Kerfriden, Pierre, et al., "Composites", (2008), 26 pages.

Sadagopan, D, et al., "Application of Genetic Algorithms to Optimal Tailoring of Composite Materials", Composites Science and Technology 58, (1998), 571-589.

Sigmund, Ole, "A New Class of Extremal Composites", Journal of the Mechanics and Physics of Solids 48, (2000), 397-428.

Torquato, S. "Modeling of physical properties of composite materials", International Journal of Solids and Structures 37, (2000), 411-422.

Torquato, S, et al., "Multifunctional Composites", Optimizing Microstructures for Simultaneous Transport of Heat and Electricity, Physical Review Letters, vol. 89, No. 26, (Dec. 23, 2002), 4 pages.

Wang et al. "Elastic property of multiphase composites with random microstructures", Journal of Computational Physics 228 (2009), 11 pages.

* cited by examiner

AUTOMATED METHOD TO DETERMINE COMPOSITE MATERIAL CONSTITUENT PROPERTIES

CLAIM OF PRIORITY

This patent application is a continuation application of U.S. patent application Ser. No. 13/846,061, filed Mar. 18, 2013, now U.S. Pat. No. 8,868,385, which is a continuation application of U.S. patent application Ser. No. 13/011,076, filed Jan. 21, 2011, now U.S. Pat. No. 8,401,829, which claims the benefit of priority, under 35 U.S.C. §119(e), to U.S. Provisional Patent Application Ser. No. 61/297,037, entitled "AUTOMATED METHOD TO DETERMINE COMPOSITE MATERIAL CONSTITUENT PROPERTIES," filed on Jan. 21, 2010, which is hereby incorporated by reference herein in its entirety.

TECHNICAL FIELD

This invention relates to modeling of composite materials. Specifically, this invention relates to finite element analysis modeling of fiber in matrix composite materials.

BACKGROUND

In order to simulate the thermo-mechanical response of fiber-reinforced composite materials, one must first derive constitutive equations to relate the average stress in the composite material to the average strain in the composite material. These composite average constitutive equations are most often developed by employing a micromechanical model that simulates the manner in which the constituent materials (e.g. fiber and matrix) interact to produce the overall thermo-mechanical properties of the composite material. The micromechanical model can be analytical or numerical in nature, but it is generally accepted that the micromechanical model only approximately represents a) the geometry of constituent materials, b) the material properties of the constituent materials and c) the manner in which the constituent materials interact with each other. Given the approximate nature of the micromechanical model, it is also generally accepted that the use of measured properties of homogeneous bulk constituent material do not result in a micromechanical model that predicts accurate composite material properties.

Consequently, micromechanical models use in situ properties of the constituent materials which effectively account for (i.e., counteract) all of the other approximations and uncertainties inherent in the micromechanical model, thus resulting in a micromechanical model that predicts overall composite properties that closely match the measured properties of the same composite material.

The determination of the in situ constituent properties represents a complex mathematical optimization problem where a consistent, physically-admissible set of constituent properties must be determined so as to cause the micromechanical model to predict composite material properties that agree closely with the measured properties of the composite material. The mathematical problem is non-deterministic since there are more constituent properties to be determined than there are experimentally measured properties for the composite material. Consequently, there are an infinite number of solutions to the problem; however, only a very small number of the solutions for the set of in situ constituent properties yield micromechanical models that can be used for both a) accurately predicting the overall properties of the composite material (known as homogenization), and b) accurately predicting the average stress and strain in the various constituent materials from the average stress and strain in the composite material (known as localization). In general, both of these processes (homogenization and localization) must be performed accurately in order to correctly predict the response of composite structures to thermal and mechanical loading.

What is needed is an automatic method to determine in situ constituent properties. What is also needed is a consistent, accurate, and repeatable method to determine in situ constituent properties.

DETAILED DESCRIPTION

Figure 1:
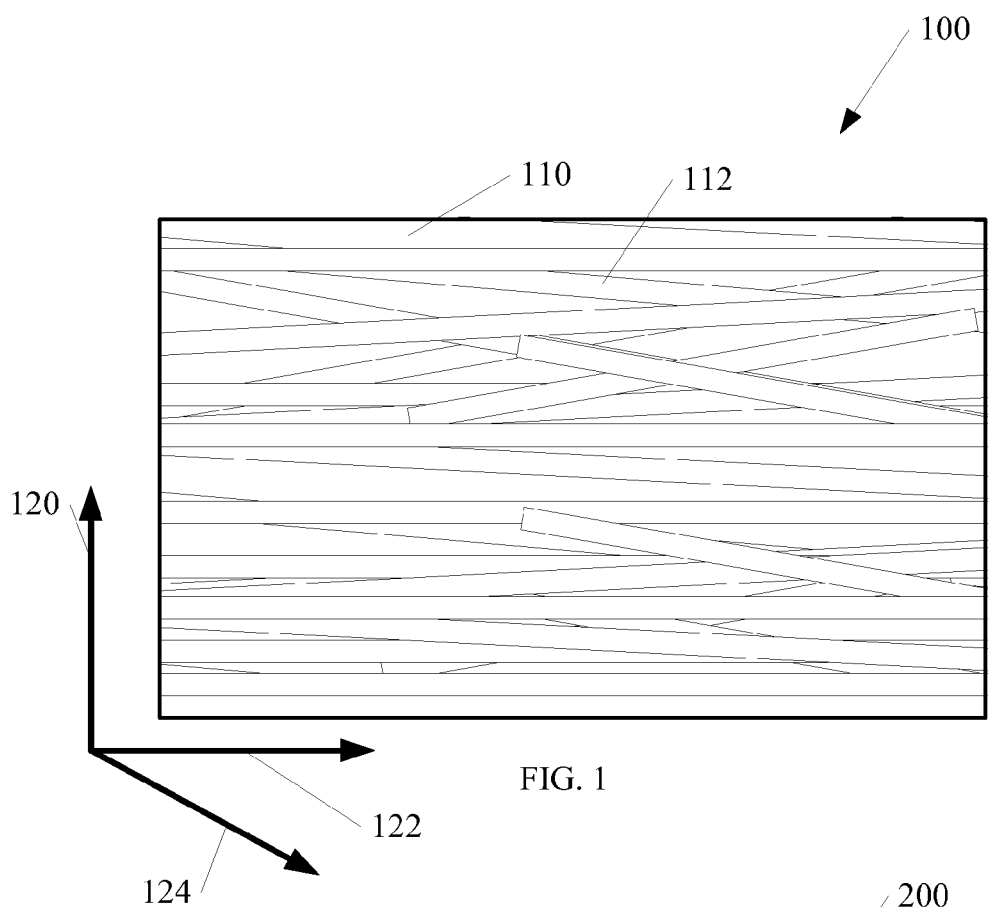
FIG. 1 shows an example of a composite material for characterization according to an embodiment of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, electrical, mechanical, logical changes, etc. may be made without departing from the scope of the present invention.

FIG. 1 shows an example composite material 100 for characterization using methods described. The composite material 100 is a fiber reinforced composite, having a number of constituents. The constituents illustrated in the composite material 100 of FIG. 1 are fibers 112 embedded within a matrix 110. In one example the fibers 112 are carbon fibers and the matrix 110 is a polymer matrix such as an epoxy resin. Although carbon fiber/epoxy composite materials are of commercial importance, other composite materials can also be characterized using the methods and software described.

Also shown in FIG. 1 are coordinate axes including a first direction 120 in the plane of the page, a second direction 122 also in the plane of the page, and normal to the first direction, and a third direction 124 illustrated as oriented out of the page normal to the first and second directions. One of ordinary skill in the art will recognize the standard coordinate system such as x, y, z or 1, 2, 3 directions, etc. The example composite material 100 in FIG. 1 includes a microstructure with most fibers 112 being oriented parallel to the second direction 122.

Figure 2:
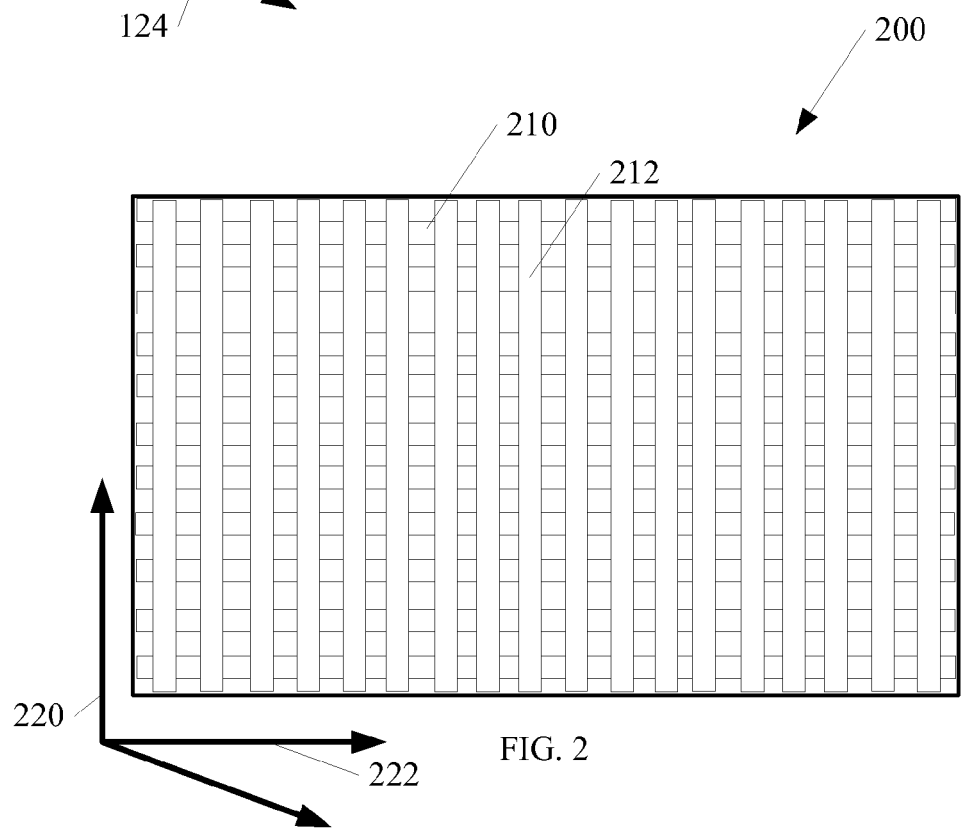
FIG. 2 shows another example of a composite material for characterization according to an embodiment of the invention.

FIG. 2 shows another example composite material 200 for characterization using methods described. Similar to FIG. 1, the composite material 200 is also a fiber reinforced composite, having a number of fibers 212 embedded within a matrix 210. FIG. 2 illustrates another possible microstructure of a composite material. In FIG. 2, two sets of fibers 212 are shown, with one set substantially parallel to a first direction 220 and another set of fibers 212 substantially parallel to a second direction 222. Other microstructures of fiber reinforced composite materials can also be characterized using the methods shown below, including but not limited to woven fibers, randomized fiber orientations, etc.

As discussed above, when modeling a composite material such as a carbon fiber/polymer composite, the individual properties of the constituents (fibers, epoxy, etc.) often cannot be used to achieve an accurate model of a composite material. For example, using material properties of an individual fiber in air and a bulk epoxy by itself may not yield an accurate prediction of behavior of a fiber reinforced composite. Methods shown below provide in situ constituent properties or adjusted material properties that yield an accurate model of a composite material.

Figure 3:
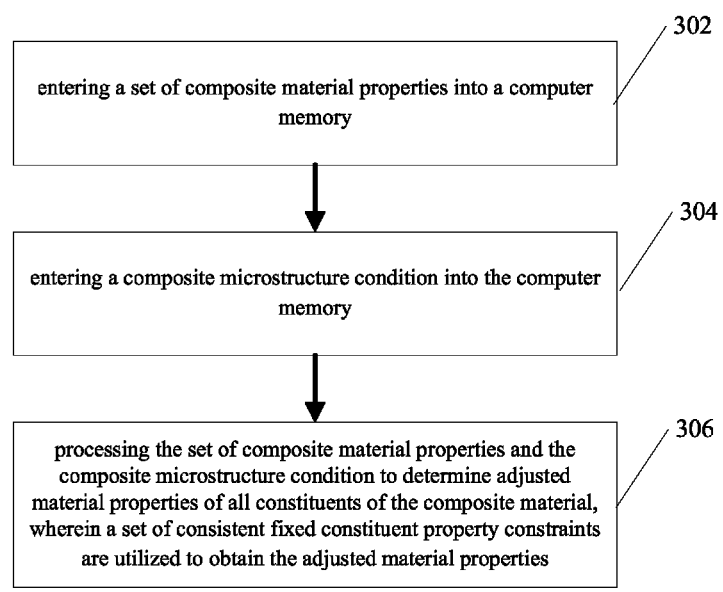
FIG. 3 shows a method of characterization according to an embodiment of the invention.

FIG. 3 illustrates a method of determining in situ constituent properties according to an embodiment of the invention. In operation 302, a number of composite material properties are entered into a computer memory. In one embodiment, composite material properties include the average moduli of the composite material, the average Poisson ratios of the composite material, the average coefficients of thermal expansion of the composite material and the strengths of the composite material. One example complete collection of composite material properties that can serve as input to the computer program is listed below, where required properties are distinguished from optional properties.

Moduli of the Composite Material:
$E_{11}^c$ (required)—modulus of elasticity in the 1 direction
$E_{22}^c$ (required)—modulus of elasticity in the 2 direction
$E_{33}^c$ (optional)—modulus of elasticity in the 3 direction
$G_{12}^c$ (required)—shear modulus in the 1-2 plane
$G_{13}^c$ (optional)—shear modulus in the 1-3 plane
$G_{23}^c$ (optional)—shear modulus in the 2-3 plane Poisson Ratios of the Composite Material:
$v_{12}^c$ (required)—Poisson ratio in the 1-2 plane
$v_{13}^c$ (optional)—Poisson ratio in the 1-3 plane
$v_{23}^c$ (optional)—Poisson ratio in the 2-3 plane Coefficients of Thermal Expansion of the Composite Material:
$\alpha_{11}^c$ (optional)—coefficient of thermal expansion in the 1 direction
$\alpha_{22}^c$ (optional)—coefficient of thermal expansion in the 2 direction
$\alpha_{33}^c$ (optional)—coefficient of thermal expansion in the 3 direction In operation 304, a composite microstructure condition is entered into the computer memory. Examples of composite microstructures are illustrated in FIGS. 1 and 2 above. As discussed above, the invention is not limited to the example microstructures.

In operation 306, the set of composite material properties and the composite microstructure conditions are processed using computer software to automatically determine adjusted material properties or in situ properties of all constituents of the composite material. Although not a typical solution, in one example, adjusted material properties or in situ properties of only a selected portion of the constituents may be determined. For example, adjusted material properties of only the fiber constituents, without the matrix constituents.

As recited in operation 306, a set of consistent fixed constituent property constraints are imposed on the optimization process that is utilized to obtain the adjusted material properties. Examples of fixed constituent property constraints might include, but are not limited to, Poisson ratios, Young's moduli, or shear moduli being assumed the same in two of the three planes, etc.

By fixing a set of constituent property constraints in the software, end user intervention is not required. Fixed constituent property constraints provide a software solution that yields consistent results from one operator to another and in different locations, etc. In contrast, if end user operators of finite element software are allowed to vary constraints, one accurate individual material model can conceivably be obtained, however a different user at a different location may use a different set of constraints to obtain a different, but logical solution. It is desirable to have all users at any location not only arriving at the same solution to a material model, but also obtaining the solution in the same way. This ensures that the model will consistently predict material behavior not just at one desired stress/strain state, but in all simulated states.

Examples of adjusted material properties or in situ properties of a constituent of the composite material are listed below for the generic $i^{th}$ constituent material in a composite material that consists of two or more constituent materials.

Figure 4:
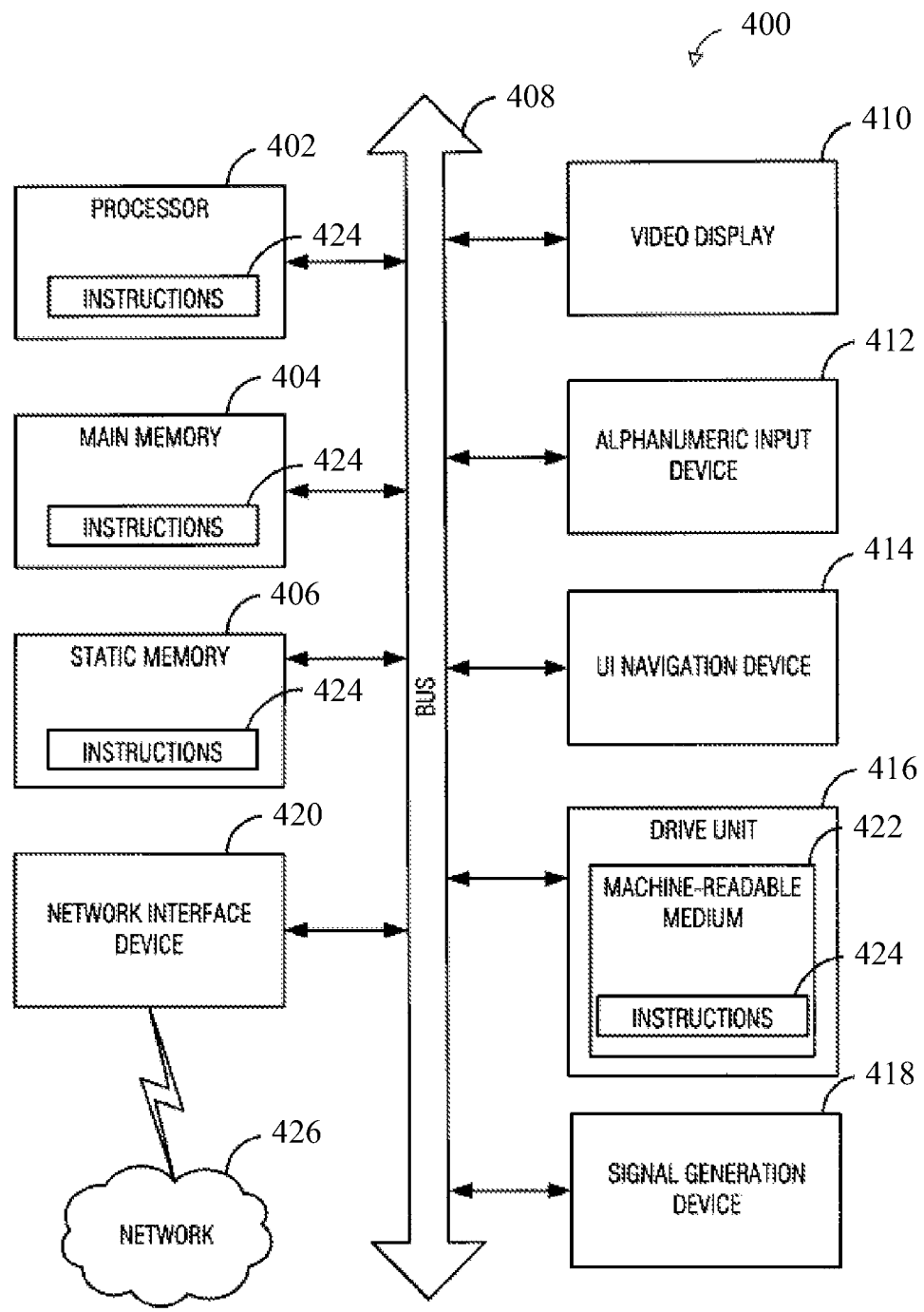
FIG. 4 shows a computer or other machine for carrying out methods according to an embodiment of the invention.

In Situ Moduli of the $i^{th}$ Constituent Material:
$E_{11}^i$—modulus of elasticity of the $i^{th}$ constituent material in the 1 direction
$E_{22}^i$—modulus of elasticity of the $i^{th}$ constituent material in the 2 direction
$E_{33}^i$—modulus of elasticity of the $i^{th}$ constituent material in the 3 direction
$G_{12}^i$—shear modulus of the $i^{th}$ constituent material in the 1-2 plane
$G_{13}^i$—shear modulus of the $i^{th}$ constituent material in the 1-3 plane
$G_{23}^i$—shear modulus of the $i^{th}$ constituent material in the 2-3 plane In Situ Poisson Ratios of the $i^{th}$ Constituent Material:
$v_{12}^i$—Poisson ratio of the $i^{th}$ constituent material in the 1-2 plane
$v_{13}^i$—Poisson ratio of the $i^{th}$ constituent material in the 1-3 plane
$v_{23}^i$—Poisson ratio of the $i^{th}$ constituent material in the 2-3 plane In Situ Coefficients of Thermal Expansion of the $i^{th}$ Constituent Material:
$\alpha_{11}^i$—coefficient of thermal expansion of the $i^{th}$ constituent material in the 1 direction
$\alpha_{22}^i$—coefficient of thermal expansion of the $i^{th}$ constituent material in the 2 direction
$\alpha_{33}^i$—coefficient of thermal expansion of the $i^{th}$ constituent material in the 3 direction FIG. 4 illustrates a diagrammatic representation of a machine 400 capable of performing the methods or implementing the systems/devices described herein according to an example embodiment. In alternative embodiments, the machine may comprise a computer, a network router, a network switch, a network bridge, a Personal Digital Assistant (PDA), a cellular telephone, a web appliance, a set-top box (STB) or any machine capable of executing a sequence of instructions that specify actions to be taken by that machine.

The machine 400 includes a processor 402, a main memory 404, and a static memory 406, which communicate with each other via a bus 408. The machine 400 may further include a video display unit 410 (e.g., a liquid crystal display (LCD) or a cathode ray tube (CRT)). The machine 400 also includes an alphanumeric input device 412 (e.g., a keyboard), a user interface navigation device 414 (e.g., a mouse), a disk drive unit 416, a signal generation device 418 (e.g., a speaker) and a network interface device 420 to interface the computer system to a network 426.

The disk drive unit 416 includes a machine-readable medium 422 on which is stored a set of instructions or software 424 embodying any one, or all, of the methodologies described herein. The software 424 is also shown to reside, completely or at least partially, within the main memory 404 and/or within the processor 402. The software 424 may further be transmitted or received via the network interface device 420 using the network 426.

For the purposes of this specification, the term "machine-readable medium" shall be taken to include any medium which is capable of storing or encoding a sequence of instructions for execution by the machine and that cause the machine to perform any one of the methodologies of the inventive subject matter. The term "machine-readable medium" shall accordingly be taken to include, but not be limited to, solid-state memories, optical and magnetic disks, and carrier wave signals. Further, while the software is shown in FIG. 4 to reside within a single device, it will be appreciated that the software could be distributed across multiple machines or storage media, which may include the machine-readable medium. In one example the instructions or software 424 are implemented as a module or plug in that is used in conjunction with other commercially available finite element software.

Although selected advantages are detailed above, the list is not intended to be exhaustive. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A method comprising:
   receiving, at a machine comprising a processor and a memory, composite material properties for a composite material to be simulated;
   receiving, at the machine, a composite microstructure for the composite material to be simulated; and
   obtaining, using the processor and the memory, a set of adjusted material properties for one or more constituents of the composite material, for use in simulating the composite material, by processing the composite material properties and the composite microstructure using fixed constituent property constraints;
   wherein the fixed constituent property constraints apply across multiple users and multiple locations to provide consistency in predicted material behavior in multiple simulated states, and the multiple users cannot vary the fixed constituent property constraints across multiple simulations.

2. The method of claim 1, wherein the composite material properties comprise:
   a modulus of elasticity in a first direction;
   a modulus of elasticity in a second direction that is normal to the first direction;
   a shear modulus in a plane defined by the first direction and the second direction; and
   a Poisson ratio in the plane defined by the first direction and the second direction.

3. The method of claim 2, wherein the composite material properties comprise a coefficient of thermal expansion.

4. The method of claim 2, wherein the composite material properties comprise:
   a modulus of elasticity in a third direction that is normal to both the first direction and the second direction;
   a shear modulus in a plane defined by the first direction and the third direction;
   a shear modulus in a plane defined by the second direction and the third direction;
   a Poisson ratio in the plane defined by the first direction and the third direction; and
   a Poisson ratio in the plane defined by the second direction and the third direction.

5. The method of claim 4, wherein the composite material properties comprise:
   a coefficient of thermal expansion in the first direction;
   a coefficient of thermal expansion in the second direction; and
   a coefficient of thermal expansion in the third direction.

6. The method of claim 2, wherein the composite material comprises a fiber in matrix composite material.

7. The method of claim 6, wherein the composite material comprises a woven carbon fiber/polymer matrix composite material.

8. The method of claim 1, wherein obtaining the set of adjusted material properties comprises determining in situ properties of a selected portion of the constituents of the composite material.

9. A system comprising:
   a processor;
   a memory having instructions that cause the processor to (i) obtain composite material properties for a composite material to be simulated, (ii) obtain a composite microstructure for the composite material to be simulated, and (iii) obtain a set of adjusted material properties for one or more constituents of the composite material, for use in simulating the composite material, by processing the composite material properties and the composite microstructure using fixed constituent property constraints, wherein the fixed constituent property constraints apply across multiple users and multiple locations to provide consistency in predicted material behavior in multiple simulated states, and the multiple users cannot vary the fixed constituent property constraints across multiple simulations.

10. The system of claim 9, wherein the composite material properties comprise:
    a modulus of elasticity in a first direction;
    a modulus of elasticity in a second direction that is normal to the first direction;
    a shear modulus in a plane defined by the first direction and the second direction; and
    a Poisson ratio in the plane defined by the first direction and the second direction.

11. The system of claim 10, wherein the composite material properties comprise a coefficient of thermal expansion.

12. The system of claim 10, wherein the composite material properties comprise:
    a modulus of elasticity in a third direction that is normal to both the first direction and the second direction;
    a shear modulus in a plane defined by the first direction and the third direction;
    a shear modulus in a plane defined by the second direction and the third direction;
    a Poisson ratio in the plane defined by the first direction and the third direction; and
    a Poisson ratio in the plane defined by the second direction and the third direction.

13. The system of claim 12, wherein the composite material properties comprise:

a coefficient of thermal expansion in the first direction;
a coefficient of thermal expansion in the second direction; and
a coefficient of thermal expansion in the third direction.

14. The system of claim 10, wherein the composite material comprises a fiber in matrix composite material.

15. The system of claim 14, wherein the composite material comprises a woven carbon fiber/polymer matrix composite material.

16. The system of claim 9, wherein obtaining the set of adjusted material properties comprises determining in situ properties of a selected portion of the constituents of the composite material.

17. A non-transitory machine-readable medium with instructions stored thereon, the instructions configured to perform operations comprising:
   obtaining composite material properties for a composite material to be simulated;
   obtaining a composite microstructure for the composite material to be simulated; and
   obtaining a set of adjusted material properties for one or more constituents of the composite material, for use in simulating the composite material, by processing the composite material properties and the composite microstructure using fixed constituent property constraints;
   wherein the fixed constituent property constraints apply across multiple users and multiple locations to provide consistency in predicted material behavior in multiple simulated states, and the multiple users cannot vary the fixed constituent property constraints across multiple simulations.

18. The non-transitory machine-readable medium of claim 17, wherein the composite material properties comprise:
   a modulus of elasticity in a first direction;
   a modulus of elasticity in a second direction that is normal to the first direction;
   a shear modulus in a plane defined by the first direction and the second direction; and
   a Poisson ratio in the plane defined by the first direction and the second direction.

* * * * *